Patented Jan. 15, 1946

2,393,007

UNITED STATES PATENT OFFICE 2,393,007

METHOD OF POLYMERIZING VINYL COMPOUNDS

William D. Wolfe, Cuyahoga Falls, Ohio, assignor to Wingfoot Corporation, Wilmington, Del., a corporation of Delaware No Drawing. Application October 12, 1940, Serial No. 360,953

1 Claim. (Cl. 260—84.5)

This invention relates to an improved method of copolymerizing a plurality of monomeric compounds and, more particularly, to a method of copolymerizing a butadiene and acrylonitrile.

In the preparation of rubber-like masses from certain unsaturated compounds, one method employed is to heat the substances in an aqueous emulsion containing an emulsifying agent and an oxidant, catalysts and modifying ingredients also being sometimes present. This reaction is conducted at a rather low temperature, temperatures from about room temperature up to 80° being customarily employed, and a temperature of 50° C. being usually preferred. Until recently, the reaction was rather slow since the temperature was low and could not be increased greatly due to the unfavorable effect on the properties of the copolymer obtained. Hence, it is important to maintain as favorable conditions for the reaction as possible.

Heretofore, it has not been observed that the atmosphere surrounding the charge had any effect on the polymerization, or, where attention has been paid to this fact, it has been suggested that oxygen in the atmosphere had a favorable influence. It has now been discovered that, actually, oxygen in comparatively small amounts definitely inhibits the copolymerization of butadiene and acrylonitrile, as well as that of other similar monomers. Indeed, oxygen in amount as little as 0.7%, preferably not over 0.5%, of the weight of the combined monomers proves sufficient to completely inhibit polymerization of butadiene and acrylonitrile during a period of 20 hours at a temperature of 38° C. At the same time, charges which were maintained under the same conditions but which had been excluded from contact with an atmosphere containing oxygen gave yields of at least 80% of copolymer. This effect is surprising and not to be expected since the copolymerization requires the presence of an oxidant in the emulsion itself, a substance such as sodium perborate, which readily evolves oxygen, being used. Despite the necessity for an oxygen-yielding material in the charge, it has now been definitely established that free oxygen in the atmosphere in contact with the emulsion must be avoided for best results, the charge coming intimately into contact with this atmosphere since it must be agitated during the polymerization.

To show the effect of oxygen on a copolymerization, a batch was made up containing the following ingredients:

| | | |
|---|---|---|
| Butadiene | g | 150 |
| Methacrylonitrile | g | 67 |
| CCl$_4$ | g | 5.6 |
| 7.76 N NaOH | cc | 1.4 |
| NaBO$_3$.4H$_2$O | g | 1.4 |
| A 2.5% solution of Aresket #300 (a sodium sulfonate of an alkyl substituted biphenyl) | g | 250 |

Aliquot portions of the above batch were stored in glass bottles provided with screw cap closures. The bottles and contents were chilled to −70° to −80° C. for a final filling with butadiene. Two of the bottles were closed at this temperature, trapping air in them, and two were connected with a gas measuring apparatus and allowed to warm up slowly. They were capped after a volume of gas had escaped from each which was about 3.5 times the volume of the air space above the charge. This was accomplished after the butadiene had begun to boil rather freely, the procedure being calculated to remove essentially all of the air that was in the cold bottles. The two pairs of bottles were then agitated for a period of 140 hours at 50° C. At the end of this time, it was found that no polymer whatever had formed in the bottles which contained air but considerable copolymer was found in those from which the air had been removed, a yield of 80% being obtained from one bottle.

In other experiments employing the same technique as that described above for removing oxygen, mixtures of various monomers gave the following results:

| Monomers | Hours | Temperature | Polymer yield | |
|---|---|---|---|---|
| | | | Air present | Air excluded |
| | | Degrees | Per cent | Per cent |
| Butadiene+o-Me styrene | 700 | 50 | None | 78.6–91.6 |
| Butadiene+o-Cl styrene | 116 | 50 | 73.0–68.5 | 90.8 |
| Butadiene+Me-methacrylate | 20 | 38 | 10.5–8.3 | 34.5–40.4 |
| Butadiene+acrylonitrile | 20 | 32 | 25.1–21.2 | 91.6–93.5 |

Further tests were then run on batches made up of butadiene and acrylonitrile in 60:40 ratio, emulsified in 2.5% aqueous solution of a sodium sulfuric acid ester of higher fatty alcohols, i. e., those containing from 12 to 18 carbon atoms, and in the presence of approximately 0.8% of NaBO$_3$.4H$_2$O based on the monomers. Charges of this solution were placed in bottles and known volumes of mixtures of oxygen and nitrogen in varying ratios were admitted, or, known volumes of oxygen were admitted to bottles containing varying volumes of charge. By both methods, it was found that an amount of oxygen equal to about 0.7% of the weight of the combined monomers proved sufficient to completely inhibit polymerization in the system during a period of 20 hours at 38°. During the same period and at the same temperature control bottles from which oxygen had been eliminated yielded at least 80% of copolymer.

The progressively increasing inhibiting effect of oxygen on such charges of butadiene and acrylonitrile in proportion to the amount of oxygen present was determined and tabulated. Thus,

| $O_2$—per cent in the gas mixture | $O_2$—per cent based on monomers | Per cent yield of polymer |
|---|---|---|
| 0.0 |  | 70.3 |
| 10. | 0.096 | 69.2 |
| 20. | 0.185 | 57.1 |
| 30. | 0.285 | 28.7 |
| 50. | 0.44 | 28.4 |
| 60. | 0.57 | 13.8 |
| 75. | 0.63 | 4.7 |
| 90. | 0.74 | None |
| 100. | 0.85 | None |

It will be noted in the foregoing tabulation that a gas mixture was used in which the proportion of oxygen was progressively increased, the proportion of oxygen by weight to the monomers treated likewise progressively increasing.

In another series of tests, pure oxygen was placed in bombs containing butadiene and acrylonitrile, the oxygen present being directly proportioned to the monomers without the introduction of inert gases. The effect here was similar to that obtained in the previous tests, increase in the amount of oxygen contacting with the monomers as the result of agitation of the latter resulting in corresponding decreases in the yield of copolymer, until, at a point where the oxygen was about 0.7% on the weight of the monomers, polymerization was completely inhibited. Thus

| $O_2$—Percent based on monomers | Percent yield of polymer |
|---|---|
| None | 85.0 |
| 0.10 | 75.4 |
| 0.28 | 67.2 |
| 0.69 | None |
| 1.98 | None |

The effect of oxygen in the atmosphere in contact with a polymerization batch is thus clearly established to be unfavorable and, in comparatively small amounts in proportion to the weight of the charge, definitely inhibiting. Of course, the desirability of excluding oxygen being known, this result can be achieved in any feasible manner. Thus, the air may be exhausted from reaction vessels containing the charge to permit gaseous butadiene to occupy the evacuated space, or the charge may be chilled and then warmed to permit the butadiene to sweep out the air. Also, the charged vessel may be evacuated and filled with an inert gas, such as nitrogen, or the air may be swept out with an inert gas. In short, any practicable method of removing oxygen may be employed.

While the improved method is particularly effective when applied to the polymerization of butadiene and acrylonitrile in various proportions, such as 60% butadiene and 40% acrylonitrile, it is also applicable to the polymerization of other monomeric mixtures containing at least two monomers, for example, butadiene-styrene, butadiene+ortho methyl styrene, butadiene+ortho chloro styrene, butadiene+methyl methacrylate, butadiene+methacrylonitrile, butadiene+methyl itaconate, butadiene+methyl acrylate, and butadiene+ethyl acrylonitrile. The method can also be applied to mixtures of three or more such monomeric substances and, indeed, is generally applicable to emulsion polymerizations. Likewise, emulsions of various constitutions may be made up, the emulsifying agent, the oxidant and the catalyst being varied as described. Other oxidants which may be mentioned are benzoyl peroxide, barium peroxide, hydrogen peroxide, etc. Other emulsifying agents are alkylated methylene sulfonic acid sodium salts, sodium sulphonates of alkylated biphenyls, sodium sulphonates of high melocular weight ether-alcohols, alkylated naphthalene sodium sulfonates, etc. Other catalysts are ethylene dichloride, chloro benzene and dichloro propionitrile.

While there have been described above certain preferred embodiments of the invention, the latter is not limited thereto, but only by the appended claim wherein it is intended to set forth all features of patentable novelty residing in the invention.

I claim:

In a method of preparing copolymers of butadiene-1,3 and an aliphatic acrylonitrile by polymerization in a medium containing an emulsifying agent and a peroxide oxidant, the step which comprises agitating and heating the reaction mixture in a closed atmosphere containing oxygen in amount not over 0.5% by weight of the total monomers present, other than that combined in the form of water vapor.

WILLIAM D. WOLFE.